(12) United States Patent
Gabrys et al.

(10) Patent No.: US 7,263,912 B1
(45) Date of Patent: Sep. 4, 2007

(54) FLYWHEEL HUB-TO-RIM COUPLING

(75) Inventors: Christopher W. Gabrys, Federal Way, WA (US); Dennis G. Simmons, Puyallup, WA (US)

(73) Assignee: Toray Composites (America), Inc., Tacoma, WA (US)

( * ) Notice: Subject to any disclaimer, the term of this patent is extended or adjusted under 35 U.S.C. 154(b) by 1359 days.

(21) Appl. No.: 09/630,157

(22) Filed: Jul. 31, 2000

Related U.S. Application Data

(60) Provisional application No. 60/149,945, filed on Aug. 19, 1999.

(51) Int. Cl.
*F16F 15/315* (2006.01)
(52) U.S. Cl. .............. 74/572.21; 74/572.12; 192/70.17; 464/74; 464/89
(58) Field of Classification Search .......... 74/572, 74/574, 572.2, 572.12, 572.21, 572.11; 192/70.17; 403/359.1; 464/74, 75, 89; 322/4
See application file for complete search history.

(56) References Cited

U.S. PATENT DOCUMENTS

| | | | | |
|---|---|---|---|---|
| 4,036,080 A | * | 7/1977 | Friedericy et al. ............ | 156/74 |
| 4,244,240 A | * | 1/1981 | Rabenhorst ............. | 416/134 R |
| 4,266,442 A | | 5/1981 | Zorzi ........................ | 74/572 |
| 4,341,001 A | | 7/1982 | Swartout ................... | 29/159.3 |
| 4,370,899 A | | 2/1983 | Swartout ..................... | 74/572 |
| 4,509,896 A | * | 4/1985 | Linsker ....................... | 415/18 |
| 4,821,599 A | * | 4/1989 | Medlicott .................... | 74/572 |
| 4,860,611 A | | 8/1989 | Flanagan et al. ............. | 74/574 |
| 5,124,605 A | * | 6/1992 | Bitterly et al. ............... | 152/73 |
| 5,279,183 A | | 1/1994 | Forster et al. ................ | 74/572 |
| 5,285,699 A | * | 2/1994 | Walls et al. .................. | 74/572 |
| 5,566,588 A | | 10/1996 | Bakholdin et al. ............ | 74/572 |
| 5,586,471 A | * | 12/1996 | Nardone et al. .............. | 156/60 |
| 5,628,232 A | * | 5/1997 | Bakholdin et al. ............ | 74/572 |

(Continued)

FOREIGN PATENT DOCUMENTS

EP 081968 6/1983

(Continued)

*Primary Examiner*—Chong H. Kim
(74) *Attorney, Agent, or Firm*—Morrison & Foerster LLP

(57) ABSTRACT

A flywheel system includes an annular rim mounted for high speed rotation on a flywheel hub. The hub has a radially splined exterior surface facing radially outwards. The rim includes an annular rim liner having an axis of rotation coinciding with the axis of rotation of the hub, and having an inner surface facing radially inward. The inner surface of the rim liner has integral splines projecting radially inward and extending axially. The rim liner splines mate with the hub splines. The flywheel rim liner has a modulus of elasticity $e_l$, and a density $\rho_l$, and a liner ratio $R_l$ equal to $E_l/\rho_l$. The flywheel rim has a modulus of elasticity $e_r$ in the hoop direction and a density $\rho_r$; and a rim ratio $R_r$ equal to $E_r/\rho_r$. The materials and configuration of the rim and rim liner are designed so that $R_l$ is less than or equal to $R_r$, so said flywheel rim liner grows radially with the rim.

19 Claims, 7 Drawing Sheets

U.S. PATENT DOCUMENTS

| | | | |
|---|---|---|---|
| 5,695,584 A | 12/1997 | Gregoire | 156/169 |
| 5,732,603 A * | 3/1998 | Swett et al. | 74/572 |
| 5,760,506 A * | 6/1998 | Ahlstrom et al. | 310/74 |
| 5,816,114 A * | 10/1998 | Gregoire et al. | 464/87 |
| 6,014,911 A * | 1/2000 | Swett | 74/572 |
| 6,175,172 B1 * | 1/2001 | Bakholdin et al. | 310/74 |
| 6,247,382 B1 * | 6/2001 | Umeki et al. | 403/370 |
| 6,302,800 B1 * | 10/2001 | Kundermann | 403/326 |

FOREIGN PATENT DOCUMENTS

| | | |
|---|---|---|
| GB | 2217810 | 1/1989 |
| JP | 54065266 | 5/1979 |
| JP | 01112047 | 4/1989 |
| WO | WO/99/40340 | 8/1999 |

* cited by examiner

Hoop Factors of Safety for E-glass - T700S Rotor vs. Interface Diameter
(ID = 10.450", OD = 17.600")

- ● E-glass/epoxy
- ○ T700S/epoxy (Shaded area has radial compression in both materials)

FLYWHEEL HUB-TO-RIM COUPLING

This is related to U.S. Provisional Application 60/149,945 filed on Aug. 19, 1999 and entitled "Flywheel Hub-to-Rim Coupling".

This invention pertains to a hub-to-rim coupling system for high speed composite flywheels, and more particularly to a flywheel hub-to-rim coupling that accommodates radial growth of the flywheel rim in operation without decoupling from the hub.

BACKGROUND OF THE INVENTION

Flywheels have been used for many years for storing energy in a system, and then releasing that stored energy back into the system. They provide a smoothing effect for internal combustion engines and many kinds of power equipment. More recently, modern flywheel systems have become recognized as very attractive energy storage systems in electrical applications such as uninterruptible power supplies, utility load leveling, electric vehicles and battery replacement.

Modern flywheel systems used for storage of electrical energy, in the form of mechanical rotational inertial converted from electrical energy, include a flywheel hub and rim, and a rotor and stator on the hub shaft that function as an electric motor during storage of electrical energy and as a generator during regeneration of electrical energy when the stored energy is to be reapplied into the system. The flywheel system is normally contained in a vacuum enclosure that protects it from windage losses that would occur from operation in a gas atmosphere, and provides ballistic protection against catastrophic failure of a flywheel rotating at high speed.

The flywheel rim usually comprises a composite ring made of resin-impregnated filaments wound in the hoop direction. The rim can be made of one or multiple types of fiber in a concentric ring arrangement. Flywheel designs using multiple fibers typically use the lowest modulus fibers at the inside and the higher modulus fibers on the outside. One example would be using an E-glass/epoxy ring inside a carbon/epoxy ring. Placing the lower modulus fibers on the inside produces a more favorable stress distribution in the composite rim. The less stiff inner ring tends to grow radially under the centrifugal loading more than does the outer ring. Therefore, a component of radial compressive stress is generated as the inner ring grows into the outer ring. This compression tends to counteract the radial tensile stresses generated in isolated rings under centrifugal loading.

To minimize the cost of the complete rotor, it would be desirable to use the lowest cost fibers to make the composite rim. The current price per pound of E-glass fiber is roughly one tenth of the per pound price of standard modulus carbon fiber. Intermediate and high modulus carbon fibers increase significantly in price with elastic modulus to approximately five hundred times the per pound price of E-glass fiber. A rotor using mostly E-glass would be the most economical, but such a rotor would experience a large strain of its inner diameter when spinning due to the low elastic modulus and high strain to failure, approximately 2.5%. This large strain would make the development of a strain matching hub very difficult.

The prior methods for designing hubs that can handle both the large radial growth of the inside diameter of the composite rim and the high centrifugal loads generated from high speed rotation can be classified into two categories: strain matching and sliding joint hubs. Several schemes can be used to employ strain matching hubs with composite rim flywheels. One method is to use a simple metallic cylinder for a hub. This type of hub can handle the centrifugal forces from high speed rotation however the growth of the outer diameter is very small. Therefore, the composite rim must be made of high modulus carbon fiber or made of multiple intermediate modulus carbon fiber rings that are press-fit together. Press-fitting allows a much radially thicker rim to be used so that the interface diameter between the rim and hub can be made much smaller and the resulting hoop strain on the composite rim inner diameter is also much smaller. Both of these strain-matching methods are expensive either because of use of very expensive high modulus carbon fibers or because of excessive and inefficient use of intermediate modulus carbon fiber.

Another method for strain matching hubs is to use hubs with curved spokes. These spokes allow large deflections through bending and can match the strain on the inner diameter of composite rims made of both glass and carbon fiber combined. Many such designs have been previously designed and patented. The problem with these types of hubs is that they also require excess carbon fiber in the rim to limit the rim strain because the strain of the hub outer diameter, although greater than a solid cylinder, is still limited. These hubs also require complicated machining and can suffer from fatigue problems due to the high stresses in the areas where bending is occurring.

The second category of fly wheel hubs, those that use sliding joints, have been used in high speed rotating equipment either through the use of roll pins that are radially oriented or through spline connections. Both radial roll pins and straight sided splines allow a shaft or hub to transmit torque to and from the flywheel while eliminating radial stresses at the joint and accounting for a difference in growth due to spinning. Because pins or spline teeth are radially oriented, the flywheel is kept in the center location of the shaft/hub even when there is a difference in growth. This method works well when both the shaft/hub and the-flywheel are made of metal. However, a problem arises when using this type of hub mechanism for low cost filament wound composite rims: radial holes cannot be drilled into the composite for placement of pins because this would unacceptably weaken the rim. Likewise, spline teeth could not be cut into the composite rim, for the same reason.

SUMMARY OF THE INVENTION

Accordingly, this invention provides a flywheel system having a composite flywheel rim that allows for use of low modulus, low cost fiber that has high radial growth of the inside diameter of the rim. The invention includes the use of a rim liner inside the flywheel rim that provides half of a sliding joint with the hub to be attached to the composite rim. This liner contains either holes for radial pins that match pin holes on the hub periphery or spline teeth that mate with teeth on the hub periphery. The invention includes the use of a flywheel rim liner made of a material having a ratio $R_l$ equal to $E/\rho$, where E is the modulus of elasticity in the hoop direction, and $\rho$ is the material density. The ratio $R_l$ of the rim liner material is less than or equal to the corresponding ratio $R_r$ of the rim material, so the flywheel rim liner grows radially with the rim.

DESCRIPTION OF THE DRAWINGS

The invention and its many attendant advantages will become more clear upon reading the following description of the preferred embodiments in conjunction with the following drawings, wherein.

DESCRIPTION OF THE PREFERRED EMBODIMENTS

Figure 1:
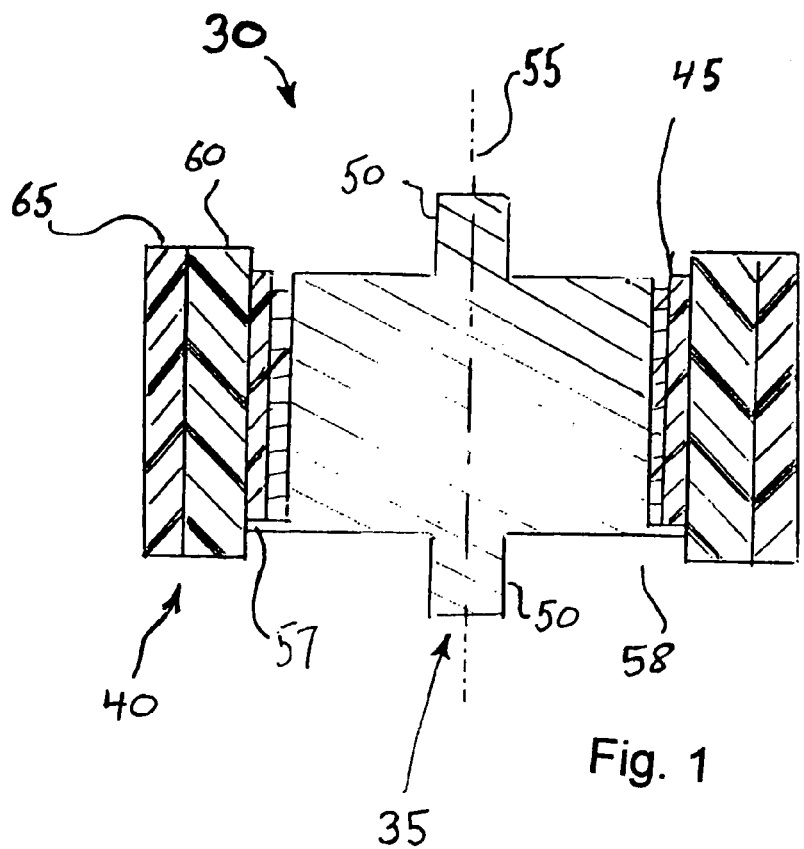
FIG. 1 is a schematic sectional elevation of a flywheel made in accordance with this invention.
Figure 2:
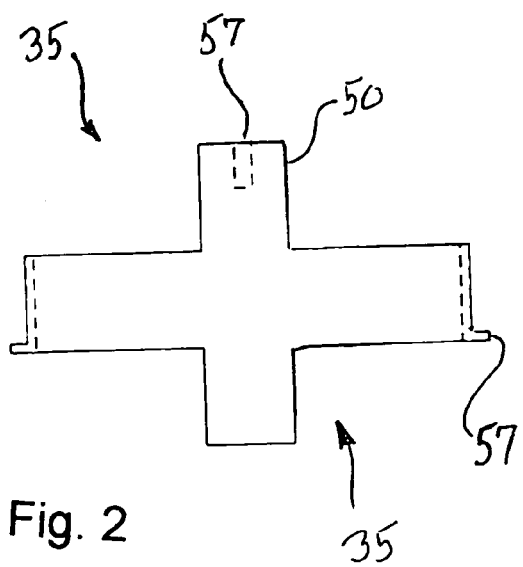
FIG. 2 is an elevation of the flywheel hub shown in FIG. 1.
Figure 3:
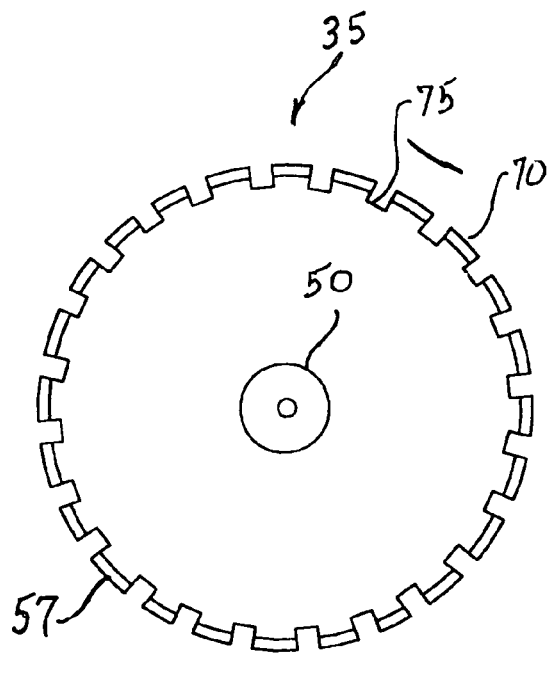
FIG. 3 is a plan view of the flywheel hub shown in FIG. 2.
Figure 4:
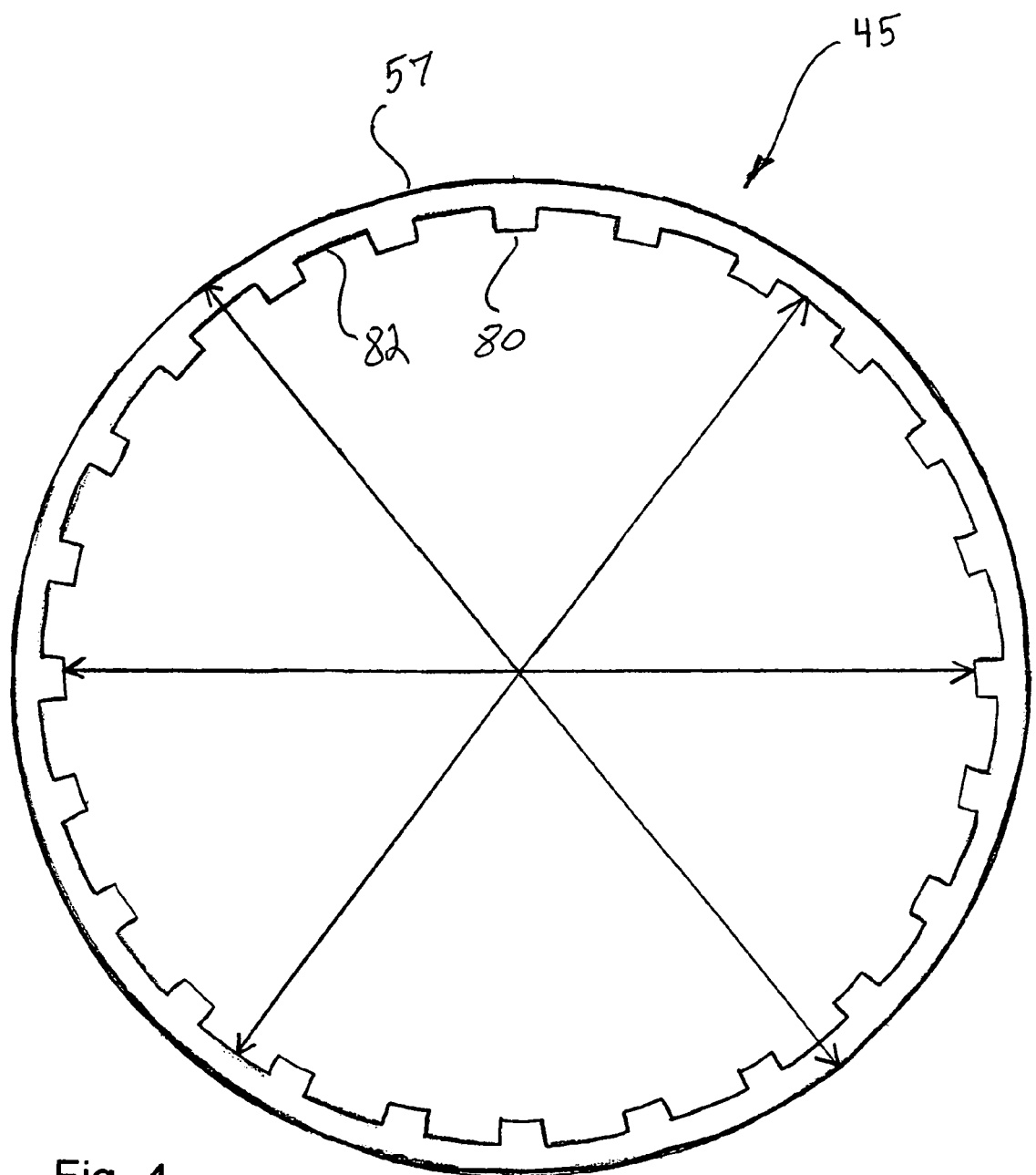
FIG. 4 is an enlarged plan view of a flywheel rim liner for use with the flywheel hub shown in FIGS. 1-3.

Turning now to the drawings, wherein like reference characters designate identical or corresponding parts, and more particularly to FIG. 1 thereof, a flywheel system 30 is shown having a hub 35, shown in FIGS. 2 and 3, and a rim 40 mounted on the hub by way of a rim liner 45, shown in FIG. 4. The hub 35, has a pair of stub shafts 50 projecting axially along an axis of rotation 55 for journaling the hub for high speed rotation in magnetic bearings within a vacuum chamber and ballistic container (not shown). An axial bore 57 may be provided for a quill shaft (not shown) for coupling to other elements in the flywheel system, as is known in the art. Other structures for supporting the hub 35 in the vacuum chamber for high speed rotation can also be used, as is well known in the flywheel industry. An electric motor/alternator is coupled to the hub 35 for initially driving the flywheel up to speed, and then recovering the energy, stored in the flywheel as rotational inertia, by converting it back to electrical energy in the alternator. A separate motor and generator may also be used, as is known in the art.

Figure 6:
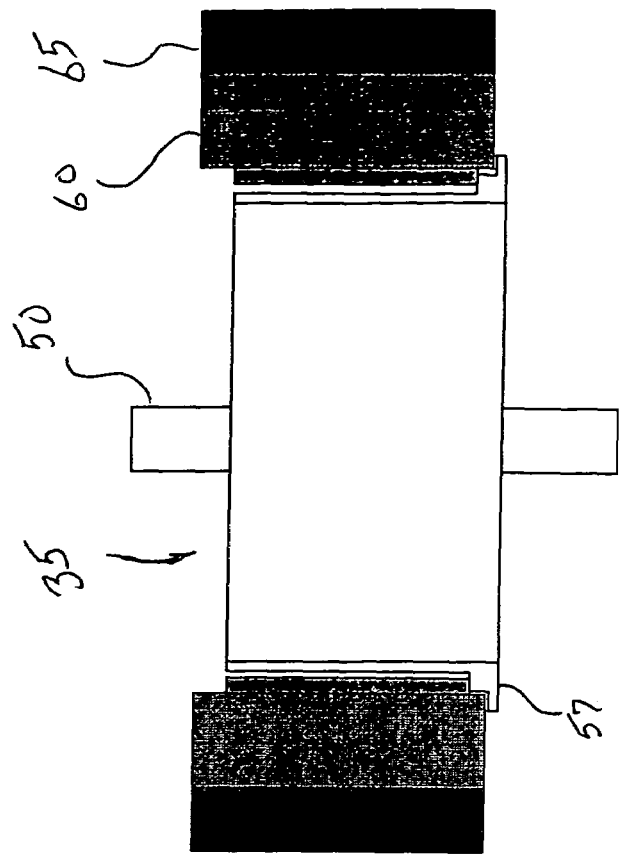
FIG. 6 is a sectional elevation of the hub shown in FIG. 5 with a rim and rim liner mounted on the hub.
Figure 5:
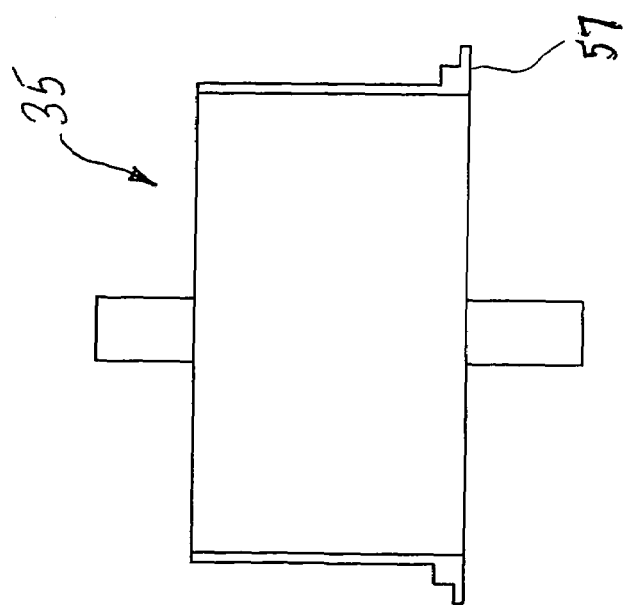
FIG. 5 is a sectional elevation of a variant of the hub in accordance with this invention, having a stepped lip for supporting the rim and rim liner.

The hub 35 is made of high strength 4340 normalized steel, although other materials such as aluminum could be used, as known in the art. The steel hub has an advantage over aluminum of high density, providing a significant amount of energy storage in the hub itself within suitable safety margins of rotational speed for the particular hub diameter, so the centrifugal forces generated in the hub remain within the strength range of the hub material. An outwardly projecting lip 57 is provided at the lower edge of the hub 35 for supporting the rim 40 and the rim 40 is locked to the hub 35 with a locking ring 58. As shown in FIGS. 5 and 6, the hub 35 may be provided with a stepped lip 57 to facilitate assembly, as discussed in more detail below.

Figure 7A:
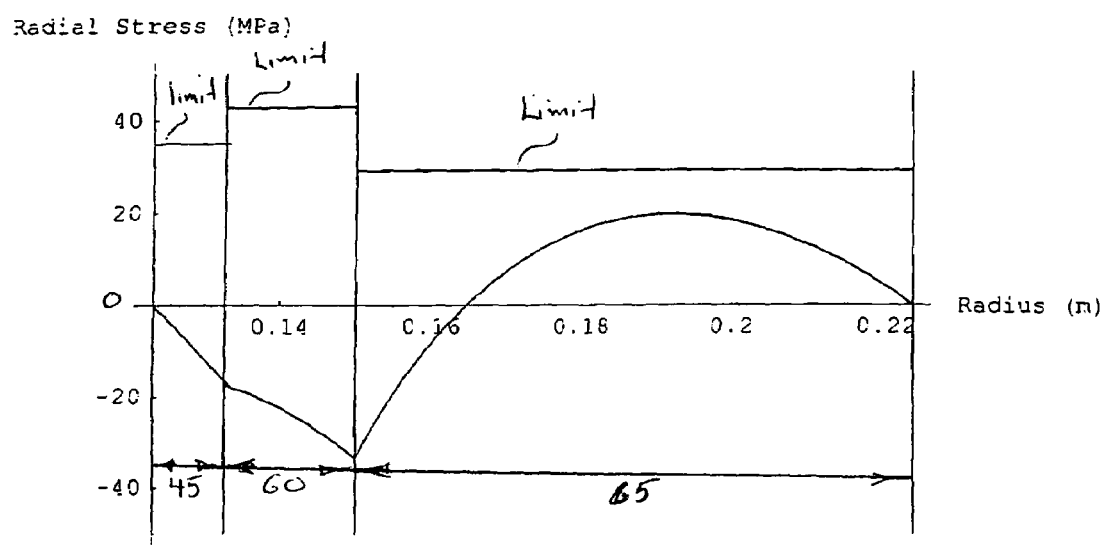
FIG. 7A is a radial stress plot for a flywheel liner and rim using a rim with mostly carbon/epoxy material.
Figure 7B:
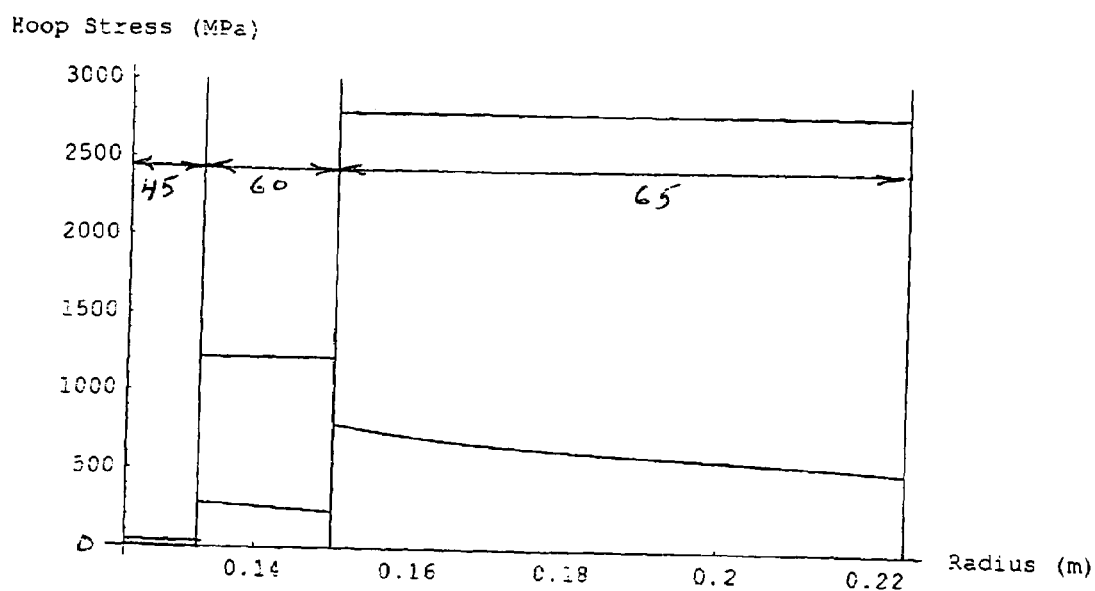
FIG. 7B is a hoop stress plot for a flywheel liner and rim using a rim with mostly carbon/epoxy material.

The flywheel rim 40 is a biannular hoop-wound or helically-wound construction having an inner winding 60 of low cost E-glass, and an outer winding 65 of carbon fiber. Such biannular rims are known in the prior art, but typically such prior art flywheel rims require a relatively thick layer of carbon fiber to constrain the radial strain of the flywheel rim so that it does not grow away from and detach from the outer diameter of hub. However, such prior art rims with a thick annular layer or ring of carbon fiber are expensive because of the large amount of carbon fiber required. Also, as indicated in FIG. 7A, they are potentially vulnerable to radial delamination on circumferential planes in the medial radial region because of radial tensile stress within the ring by virtue of the differential radial strain caused by greater centrifugal forces acting at the outer diameter than the inner diameter of the ring. Of course, the hoop stress is well within the limits of the material, as shown in FIG. 7B, since the thickness of the carbon fiber annulus is chosen for radial stiffness to prevent growth away from the hub rather than for hoop strength. Thus, the thick carbon fiber ring represents an inefficient use of materials because the hoop stress capacity of the carbon fiber ring 65 is grossly underutilized.

Figure 8A:
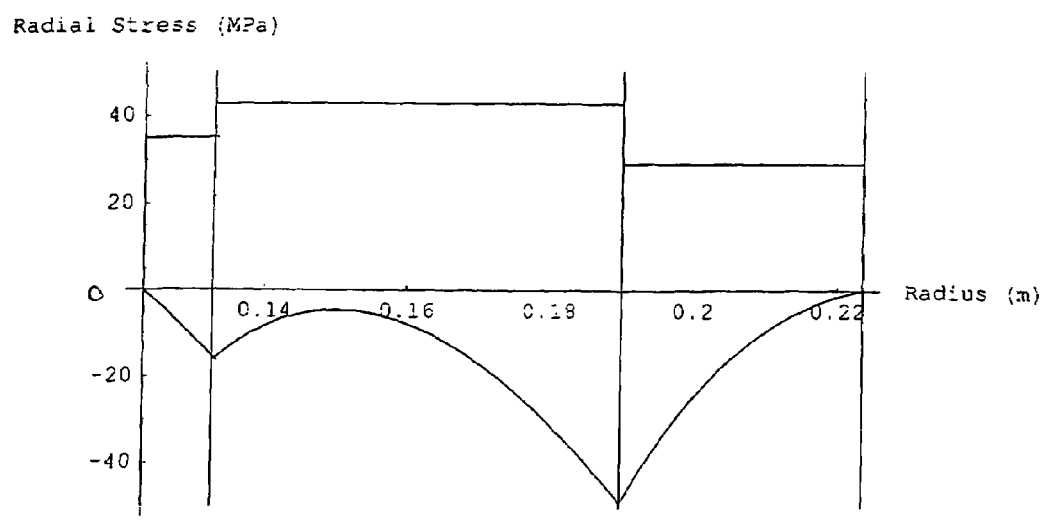
FIG. 8A is a radial stress plot for a flywheel liner and rim using a rim with about equal amounts of E-glass and carbon/epoxy material.
Figure 8B:
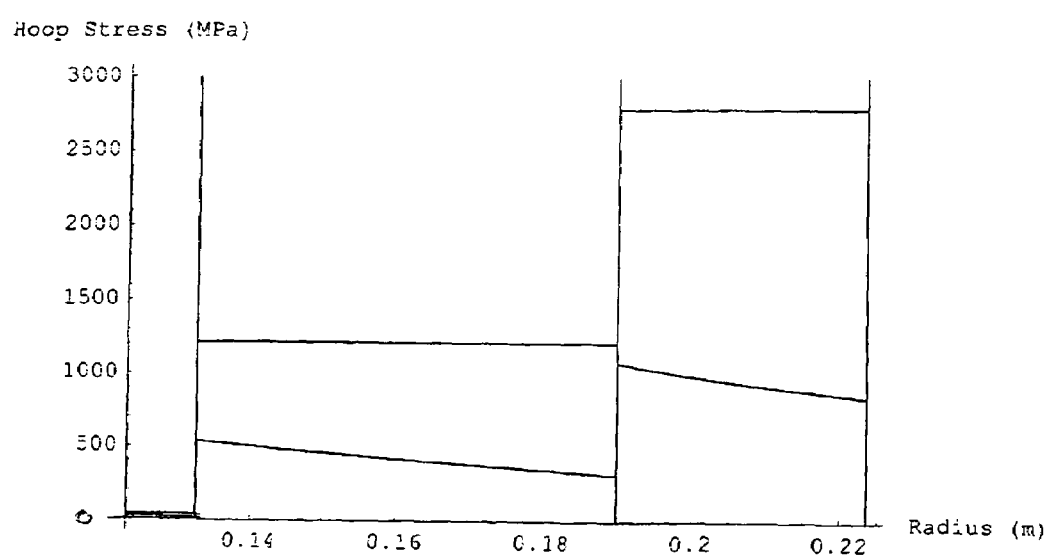
FIG. 8B is a hoop stress plot for a flywheel liner and rim using a rim with about equal amounts of E-glass and carbon/epoxy material.

This invention allows the use of a relatively high percentage of low-cost E-glass fiber and a commensurate low percentage of costly carbon fiber, or even 100% E-glass in a lower speed economy version. At high rotational speed, the low modulus E-glass fiber is capable of expansion of as much as 2.5% and the centrifugal loading of the E-glass ring 60 produces compressive loading against the carbon fiber winding 65, eliminating radial tensile stresses in the E-glass ring 60 altogether and compressively loading the carbon fiber ring 65, as shown in FIG. 8A. This makes optimal use of the high strength of the carbon fiber material and not merely its high modulus. Significantly, the smaller radial thickness of the carbon fiber ring 65 also eliminates the radial tensile stresses that exist in a thicker carbon fiber ring, as illustrated in FIG. 7A, resulting in a carbon fiber ring 65 that operates entirely in compression, as illustrated in FIG. 8A. This development makes it possible to design the entire rim 40 to operate entirely in compressive loading, thereby eliminate the danger of interlaminar delamination.

Figure 9A:
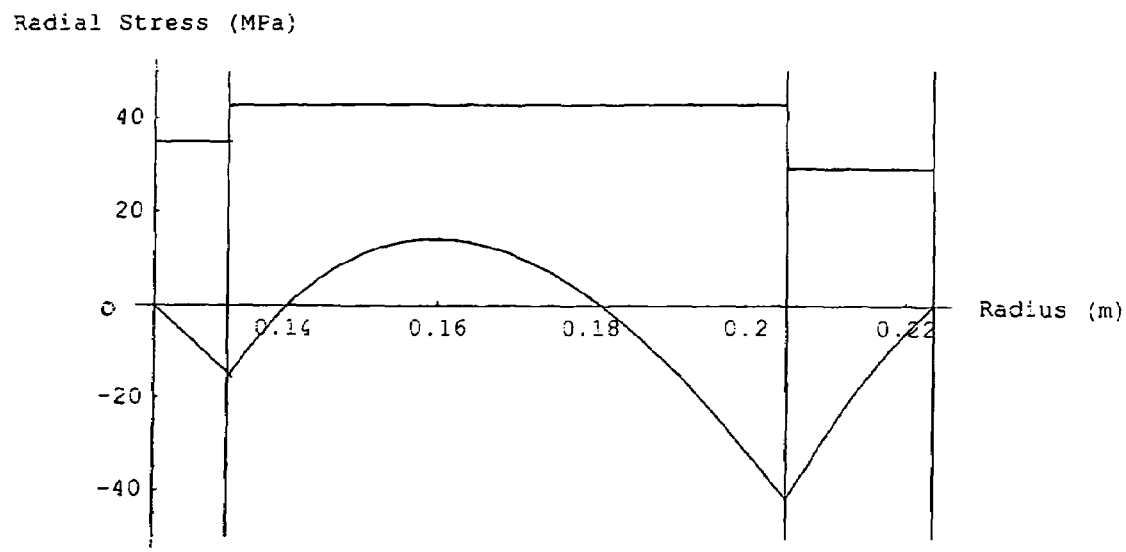
FIG. 9A is a radial stress plot for a flywheel liner and rim using a rim with mostly E-glass material.
Figure 9B:
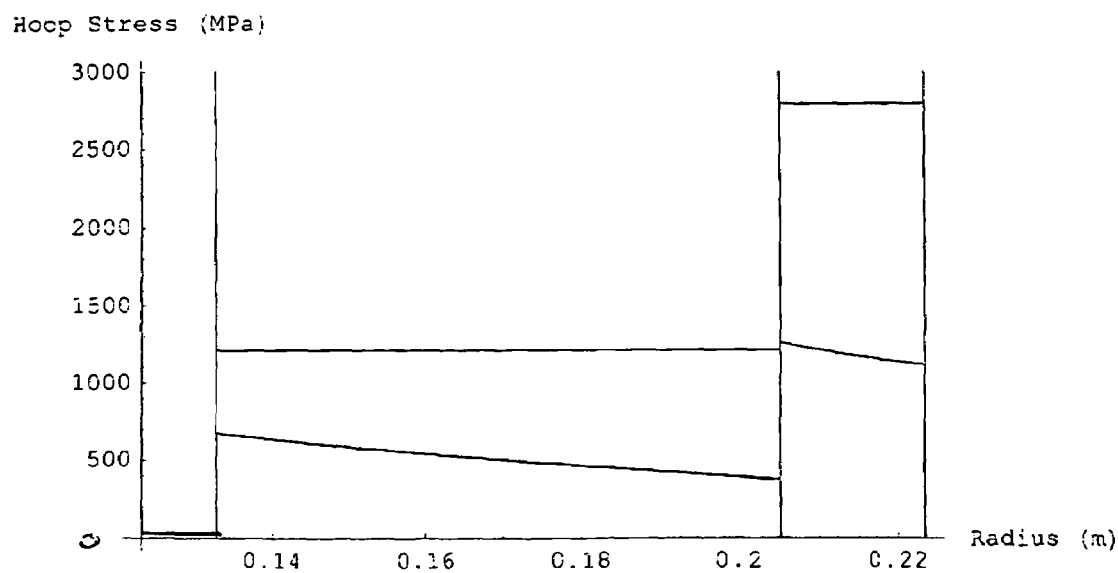
FIG. 9B is a hoop stress plot for a flywheel liner and rim using a rim with mostly E-glass material.
Figure 10:
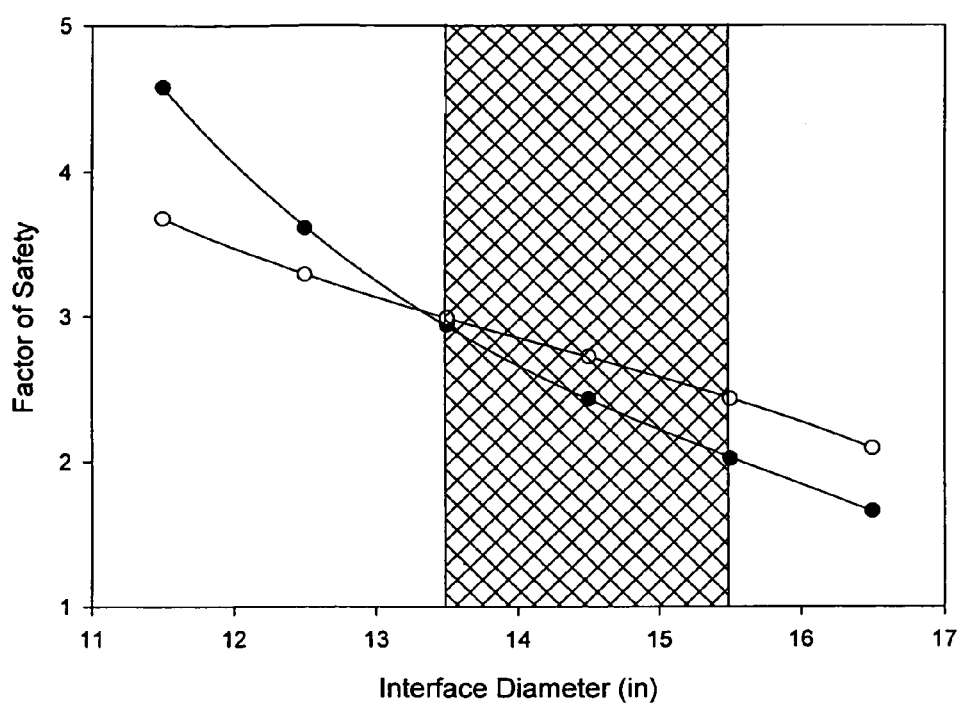
FIG. 10 is a plot of hoop factors of safety for E-glass fiber and carbon fiber vs. interface diameter between the E-glass annulus and the carbon fiber annulus in a flywheel rim, showing the regions of safe designs for these particular materials as used in a flywheel of this invention.

The stress plots for a flywheel rim having mostly E-glass, shown in FIGS. 9A and 9B illustrates a region of radial tension in the E-glass annulus that is within the tensile strength capacity of the epoxy, and shows the benefit of this invention. The percentage of carbon fiber in the flywheel represented by the plots of FIGS. 9A and 9B is much smaller than the prior art ever allowed. The hoop stress in the carbon fiber is closer to the allowable limit, thereby making much better use of the strength as well as the stiffness of the costly carbon material. FIG. 10 illustrates this point, showing how the safety factors of the glass and carbon fiber materials changes as the interface diameter changes. The safety factors of both materials decrease as the interface diameter increases, but remains above 2 at an interface diameter of 16 inches, with both materials still in compression.

The radial strain of the rim 40 results in a radial growth away from the hub. Therefore, a coupling between the rim 40 and the hub 35 must be provided that allows for a differential growth in radial dimension while maintaining a torque coupling and concentricity between the hub 35 and the rim 40.

This invention provides such a coupling between the rim 40 and the hub 35 by way of the rim liner 45. The outer circumferential surface of the hub 40 has radially projecting, axially extending projections such as pins or splines 70, equally spaced apart circumferentially by grooves or slots 75. The rim liner 45, shown in detail in FIG. 4, has integral splines 80 which mesh with the grooves 75 in the hub 35, and internal slots or grooves 82 that receive the splines 70 on the hub 35 to provide torsional coupling and maintain concentricity between the rim liner 45 and the hub 35 while allowing relative radial translation therebetween. The splines 80 in the rim liner could be replaced with pins or other such projections set into a cylindrical rim liner. For purposes of this description, the term "splines" is intended to encompass the illustrated splines as will as other forms of projections such as pins, shown in FIG. 1, that perform the same or equivalent function. The splines 80 in the rim liner 45 and the grooves 75 in the hub could be arranged in a helical pattern to provide a more angularly continuous torsional interface between the rim liner and the hub around the circumferential interface.

The rim liner 45 is made of a material such as nylon or PVC that has a elastic modulus in the hoop direction, $E_l$ (hereinafter referred to as the "hoop modulus") selected to provide a ratio $R_l$ of hoop modulus to density $E_l/\rho_l = R_l$ that is lower than the corresponding ratio $R_r = E_r/\rho_r$ for the rim materials. For rims having several materials such as glass and carbon fiber, the ratio $R_r = E_r/\rho_r$ that should be used for the purposes herein is larger value of any of the materials in the rim. This relationship ensures that when the inner diameter of the rim 40 grows radially away from the hub at high rotational speeds, the rim liner grows with it.

The rim liner is made from a material that has sufficient strength to transmit the torque between the hub and the rim liner during spin-up of the flywheel and during energy recovery from the flywheel, and has an elastic modulus and elongation capacity in the hoop direction that will allow the rim liner to grow with the composite rim when spun to high speed. Materials that will work have a ratio $R_l$ that is lower than the corresponding ratio for the rim materials, ensuring that the rim liner grows with and stays in contact with the rim during high speed operation. Examples include various plastics and also brass. The following table lists several candidate rim liner materials and comparison data for some materials that would not satisfy the requirement. $E_r$.

|  | E (GPa) | p (kg/m³) | E/p (GPa m³/kg) | Result |
|---|---|---|---|---|
| Steel | 210 | 7500 | 0.028 | grows < rim |
| Aluminum | 70 | 2700 | 0.026 | grows < rim |
| Brass | 97 | 8400 | 0.011 | grows = rim |
| PVC | 3 | 1420 | 0.002 | grows > rim |

If the liner were made from conventional construction materials like steel or aluminum, the splines would work very well, however the liner itself would not grow as much as the composite rim when spun to high speed. Therefore the rim liner could detach from the rim. The liner would grow less than the rim because the ratio of elastic modulus in the hoop direction to density of the liner would be too high. Even if the liner were shrunk-fit into the inside diameter of the rim, it would decouple from the rim before reaching the desirable operating speed.

From the table, it is clear that both brass and PVC could grow equal to or more when spun to high speed than do conventional steel and aluminum. Brass grows about the same as a low cost composite rim and plastics like PVC could grow more than the composite rim. However, because a plastic rim liner 45 would be attached to or integral with the inner diameter of the rim 40, it would be constrained by and grow the same amount as the rim 40 when spun to high speed. This is actually beneficial because the fiber reinforced rim 40 would then reinforce the much weaker plastic rim liner 45 and carry much of its own centrifugal loading. Of the two materials, PVC is preferred over brass because the strain-to-failure properties of brass are marginal for use in this application. Naturally, there are other materials that would satisfy the requirements noted above for the rim liner and the invention encompasses those other materials also.

As the rotor 30 is spun to high speed, the teeth or splines 80 of the rim liner 45 become compressed under their own centrifugal loading and become wider due to Poisson's Ratio. This tightens the connection between the liner splines 80 and the hub slots 75 and helps stabilize the rotor.

The fabrication of this type of hub system is very easy. It consists of turning and slotting a solid piece of metal or equivalent for a hub. The rim liner can be a piece of plastic or brass pipe with radial holes where pins are inserted or a single piece, with machined, cast or molded splines. An integral construction of rim and rim liner can be produced by winding the rim 40 on the rim liner 45 and curing it in place on the rim liner 45, or by molding the rim liner 45 into the rim 40. Alternatively, the rim liner 45 can be attached to the inside diameter of the rim 40 by shrink fitting, pressing, or bonding. The attached rim 40 and rim liner 45 is and then mounted onto the hub 35 by orienting the splines on the rim liner with the grooves on the hub and sliding the rim and rim liner axially onto the hub 35.

Obviously, numerous modifications and variations of the preferred embodiment described above are possible and will become apparent to those skilled in the art in light of this specification. For example, the preferred embodiment uses an inner E-glass ring and an outer carbon fiber ring, but it would be possible to use this invention with all E-glass to achieve a more economical flywheel that would operate at lower speed. Naturally, other rim materials exist presently and will be developed in the future and these other materials may be used while remaining within the scope of this invention, which is not intended to be limited to any particular materials other than in those claims in which they are specifically claimed. Many functions and advantages are described for the preferred embodiment, but in many uses of the invention, not all of these functions and advantages would be needed. Therefore, we contemplate the use of the invention using fewer than the complete set of noted features, benefits, functions and advantages. Moreover, several species and embodiments of the invention are disclosed herein, but not all are specifically claimed, although it is intended that all be covered by generic claims. Therefore, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim.

The invention claimed is:

1. A flywheel system, comprising
a flywheel hub having an axis of rotation and a radially slotted exterior surface facing radially outwards;
an annular rim liner having an axis of rotation coinciding with said hub axis of rotation, and having an inner surface facing radially inward, said inner surface having radial projections on said rim liner that mate with said hub slots to form a torque transmitting coupling therebetween that maintains concentricity between said hub and said rim liner while allowing said rim liner to grow radially with respect to said hub; and
an annular flywheel rim on said rim liner having an axis of rotation coinciding with said rim liner axis of rotation, and having a circumferential hoop direction.

2. A flywheel system as defined in claim 1, wherein:
said rim has a modulus of elasticity $E_r$ in the hoop direction; and
said rim liner has a modulus of elasticity $E_l$ in the hoop direction that is less than or equal to said rim modulus of elasticity $E_r$.

3. A flywheel system as defined in claim 1, wherein:
said flywheel rim liner has a hoop modulus of elasticity $E_l$, and a density $\rho_l$, and a liner ratio $R_l$ equal to $E_l/\rho_l$;
said flywheel rim has a modulus of elasticity $e_r$ in said hoop direction and a density $\rho_r$; and a rim ratio $R_r$ equal to $E_r/\rho_r$
wherein $R_l$ is less than or equal to $R_r$, so said flywheel rim liner grows radially with said rim.

4. A flywheel system as defined in claim 3, wherein:
said rim liner is a polyvinyl chloride tube.

5. A flywheel system as defined in claim 1, wherein:
said projections in said rim liner are pins set in said rim liner.

6. A flywheel system as defined in claim 1, wherein:
said projections in said rim liner are splines integral with said rim liner.

7. A flywheel system, comprising:
a flywheel hub having radial splines;
a flywheel rim and a flywheel rim liner in compressive contact with said rim, said flywheel rim liner having radial projections mating with said splines to form a torque transmitting coupling between said hub and said rim liner that maintains concentricity between said hub and said rim liner;
said flywheel rim liner made of a material having a strain-to-failure capability and a ratio $R_l$ equal to $E_l/\rho_l$, wherein $E_l$ is a hoop modulus of elasticity of said rim liner and $\rho_l$ is the density of said rim liner material;
said rim liner strain-to-failure capability and ratio $R_l$ being such that said rim liner remains in compressive contact with said rim throughout operation of said flywheel system.

8. A hub for a flywheel system as defined in claim 7, wherein:
said hub splines project radially outward and extend axially along the outside surface of said hub.

9. A process of coupling a flywheel rim to a flywheel hub, comprising:
mounting said rim on a rim liner; and
coupling said rim liner to said hub with a torque coupling that allows said liner to grow radially with respect to said hub while remaining concentric thereto during high speed operation.

10. A process as defined in claim 9, wherein:
said rim liner has a hoop modulus of elasticity $E_l$, and a density $\rho_l$, and a liner ratio $R_l$ equal to $E_l/\rho_l$;
said flywheel rim has a modulus of elasticity $E_r$ in said hoop direction and a density $\rho_r$; and a rim ratio $R_r$ equal to $E_r/\rho_r$
wherein $R_l$ is less than or equal to $R_r$, so said flywheel rim liner grows radially with said rim without detaching therefrom, and stays concentric to and torsionally engaged with said hub.

11. A process as defined in claim 9, wherein:
said coupling step includes engaging an array of radial projections spaced angularly around said liner in radial grooves in said hub.

12. A process as defined in claim 9, wherein:
said rim includes an inner annulus of E-glass/epoxy and an outer annulus of carbon fiber/epoxy having less material than said E-glass annulus;
whereby said carbon fiber/epoxy annulus is large enough to provide sufficient hoop strength to contain radial forces created in said rim by high speed rotation while allowing significant radial growth of said rim away from said hub, and said rim liner maintains torque coupling and concentricity of said rim and said hub during said operation despite said radial growth.

13. A process as defined in claim 12, wherein:
said rim liner has a strain-to-failure capability of greater than 4%.

14. A flywheel system, comprising:
a hub;
a flywheel rim concentric on said hub having a carbon fiber/epoxy outer annulus and, contiguous therewith, an E-glass inner annulus with an inner circumferential surface;
a rim liner engaged with said inner circumferential surface of said inner annulus;
said rim liner being made of a material that grows radially with said rim and has sufficient strength to transmit torque between said rim and said hub during flywheel spin-up and during energy recovery from said flywheel; and
a torque coupling between said hub and said rim liner that allows said liner to grow radially with respect to said hub while remaining concentric thereto during high speed operation.

15. A flywheel system as defined in claim 14, wherein:
said coupling includes an array of radial projections spaced angularly around said liner extending into radial grooves in said hub.

16. A flywheel system as defined in claim 15, wherein:
said radial projections constitute spline teeth projecting into corresponding spline grooves in said hub.

17. A flywheel system as defined in claim 16, wherein:
said spline teeth of said liner have a Poisson's Ratio which causes said teeth to be compressed under their own centrifugal loading as said rotor is spun to high speed, causing said teeth to become wider, thereby tightening the connection between the liner teeth and hub, to help keep the rotor stable.

18. A flywheel system as defined in claim 16, wherein:
said hub has a lower radially projecting lip to provide vertical support to said rim and rim liner.

19. A flywheel system as defined in claim 14, wherein:
said rim liner has a hoop modulus of elasticity $E_l$, and a density $\rho_l$, and a liner ratio $R_l$ equal to $E_l/\rho_l$;

said flywheel rim has a modulus of elasticity $E_r$ in said hoop direction and a density $\rho_r$; and a rim ratio $R_r$ equal to $E_r/\rho_r$ wherein $R_l$ is less than or equal to $R_r$, so said flywheel rim liner grows radially with said rim without detaching therefrom, and stays concentric to and torsionally engaged with said hub.

* * * * *